United States Patent [19]

Borgialli

[11] Patent Number: 4,702,888
[45] Date of Patent: Oct. 27, 1987

[54] STIRRED MICROREACTOR

[75] Inventor: Ronald R. Borgialli, Laramie, Wyo.

[73] Assignee: Electric Power Research Institute, Inc., Palo Alto, Calif.

[21] Appl. No.: 753,351

[22] Filed: Jul. 9, 1985

Related U.S. Application Data

[63] Continuation of Ser. No. 510,072, Jun. 30, 1983, abandoned.

[51] Int. Cl.⁴ .................... B01F 7/20; B01F 15/06; B01L 3/00; G01N 31/00
[52] U.S. Cl. .................... 422/50; 366/307; 422/78; 422/99; 422/130; 422/226
[58] Field of Search ............ 422/130, 205, 208, 226, 422/229, 51, 50, 135, 242, 99, 78; 430/139; 366/286, 302, 307

[56] References Cited

U.S. PATENT DOCUMENTS

| | | | |
|---|---|---|---|
| 1,320,323 | 10/1919 | Drucker et al. | 422/130 |
| 1,404,709 | 1/1922 | Allbright | 422/226 |
| 1,426,920 | 8/1922 | Sleeper | 422/226 |
| 2,381,168 | 8/1945 | Huff | 422/226 |
| 2,871,109 | 1/1959 | Snyder et al. | 422/226 |
| 2,991,161 | 7/1961 | Gasche | 422/226 |
| 2,996,363 | 8/1961 | Ruyak | 422/226 |
| 3,028,227 | 4/1962 | Ballestra | 422/234 |
| 3,056,664 | 10/1962 | Dravniers et al. | 422/205 |
| 3,466,150 | 9/1969 | Dietze et al. | 422/135 |
| 3,968,035 | 7/1976 | Howe | 210/621 |
| 4,325,914 | 4/1982 | Ruyak | 422/130 |
| 4,337,069 | 6/1982 | German, Jr. et al. | 422/234 |
| 4,368,174 | 1/1983 | Valyocsik | 422/208 |
| 4,438,074 | 3/1984 | Wilt | 422/135 |

Primary Examiner—Barry S. Richman
Assistant Examiner—C. M. Delahunty
Attorney, Agent, or Firm—Flehr, Hohbach, Test, Albritton & Herbert

[57] ABSTRACT

A microreactor for use in coal-liquifaction process monitoring and process development is disclosed. The microreactor is a batch-type reactor and is moved by means of a pneumatic lift into and out of a bath to control the temperature of the microreactor. A shaft having generally vertical vanes is provided for stirring reactants in the microreactor.

1 Claim, 2 Drawing Figures

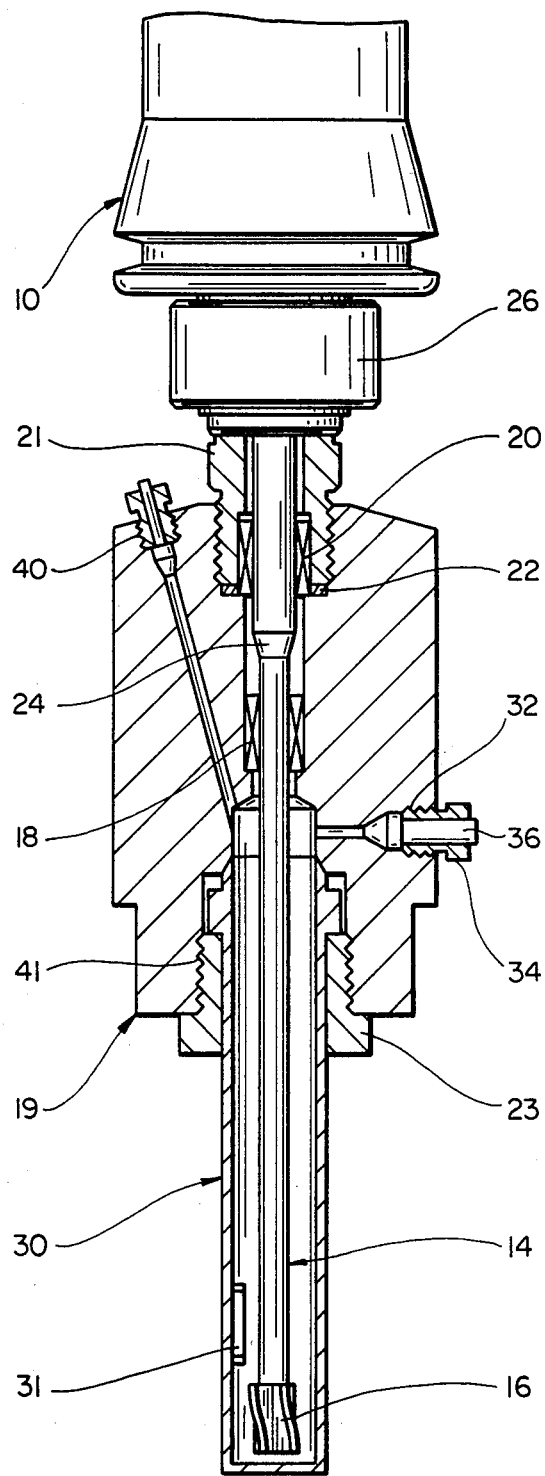
FIG_1

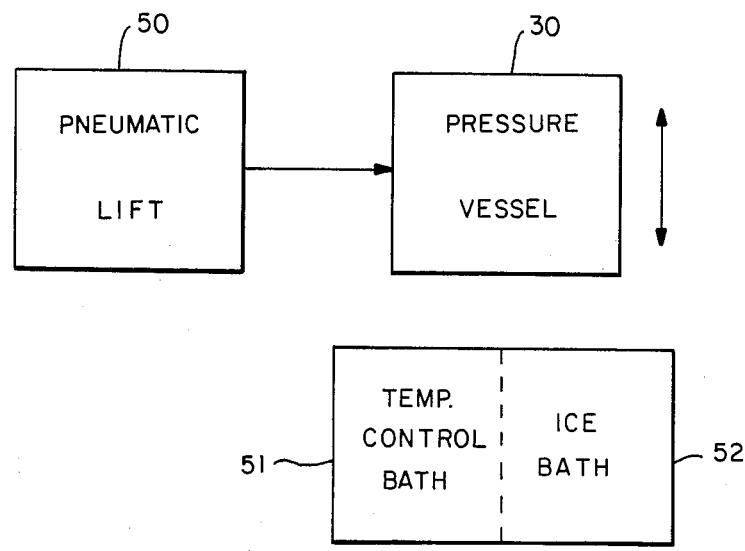
FIG.—2

STIRRED MICROREACTOR

This is a continuation of application Ser. No. 510,072 filed June 30, 1983, now abandoned.

This invention is directed to a microreactor for use in coal-liquefaction process monitoring and process development, and specifically a microreactor which operates essentially isothermally at coal liquefication temperatures and in which the contents are stirred rather than shaken.

The concept of using a microreactor as a means of measuring solvent coal liquefaction reactivity for process monitoring and process development has already been established. The use of a microreactor for process monitoring has come about because in coal liquefaction, the process being carried out comprises the addition of gaseous hydrogen to a combination of coal and a process derived oil or solvent. The process is carried out at high pressure and high temperature. While the process itself is fairly well understood, it is subject to a large number of variables, including in order of importance: temperatures; the hydrogen partial pressures; the residence time; the ratio of the solvent to the coal; the quality of the solvents; and the coal characteristics.

All of these items listed above affect the reaction which is taking place, and in ways which are not yet well understood. So it is very important to simulate on a small scale what is happening in the process being designed or in a process which is being carried out in a major plant. By doing this in a microreactor, one can then predict what will happen when the process is carried out on a large scale or predict the yield of the large scale plant depending on the adjustment of the available variables.

In order for the use of such microreactors to be valuable, however, they must accurately simulate the results of the process as carried out on a major scale. Microreactors which are currently in use typically consist of a small pressure vessel that is shaken vigorously by means of mechanical linkages. Unfortunately, in such microreactors as the solvents being evaluated become more viscous, the shaking action throws the reactants in the pressure vessel into connecting piping where it is solidified. This makes it very difficult to recover all of the product; therefore, it is difficult to accurately evaluate the results of the process. In addition, because of the shaking mode of mixing the reactants, it is naturally difficult to continuously accurately measure pressure and temperature within the vessel. However, as noted above, continuous measuring of pressure and temperature is critical to evaluation of the ongoing process.

It is therefore an objective of this invention to provide a new type of microreactor which reduces or eliminates the problems associated with previous microreactors.

It is a further objective of this invention to provide a microreactor which stirs the contents of a small pressure vessel rather than shaking them.

It is yet another object of the invention to provide a pressure vessel having ports for insertion of monitoring devices in order to continuously monitor pressure and temperature within the vessel.

It is yet another objective of the invention to provide ports for modification of hydrogen partial pressure in order that the process being modeled may be adapted on an on-going basis.

In the reactor according to the subject invention, a standard magnetic drive head rotates a shaft which extends through a specially designed coupler into the pressure vessel where it stirs the contents in the pressure vessel by means of an impeller attached to the end of the shaft. The coupler or connector includes three machined ports; one port is used to insert a sheathed thermocouple for monitoring of the internal temperature of the microreactor; the other two ports serve as hydrogen feed inlets for modification of hydrogen partial pressure and product gas exhaust.

In brief, the process which this microreactor is adapted to carry out comprises lowering the pressure vessel containing solid coal, liquid solvent and gaseous hydrogen into a temperature controlled bath such as a fluidized sand bath to attain the desired reaction temperature and hydrogen partial pressure as monitored by the sheathed thermocouple and a pressure gauge. At the end of the desired reaction time, the pressure vessel is raised out of the temperature controlled bath and immersed in an ice bath to quench the reaction. Gaseous products are vented through the exhaust port provided in the coupler, and the high pressure vessel is then detached from the coupler and the contents removed for analysis.

As a result of the unique design of coupler impeller and microreactor, an accurate representation of the process being designed or established is created.

The invention will be described with respect to FIG. 1 which shows an elevational view of a microreactor with a portion thereof shown in cross-section FIG. 2 is a block diagram schematically illustrating movement of the microreactor.

The stirred microreactor of the subject invention is especially designed so that it is completely sealed against outside pressures in order to maintain the validity of the model reaction. The microreactor is especially designed so that no mechanical seals are incorporated therein and all mechanical parts may be pressurized inside the vessel. The entire shaft inside rotates in order to mix the reactants which are contained within the pressurized vessel.

Thus, starting at the top of the microreactor shown in FIG. 1, a magnetic drive 10 is used to couple the driveshaft 14 which drives the impeller 16 to mix the reactants. The drive 10 is of the magnetic type already known in the industry and sold for example by Autoclave Engineers, Inc.; its specific internal mechanism does not comprise part of this invention. It is sufficient to note that it incorporates a magnetic coupling so that the shaft 14 is driven via the coupling without disturbing the integrity of the seal of the microreactor against the outside environment. The shaft 14 is coupled to the pressure vessel 30 by a specially designed coupler 19. It is maintained in vertical alignment by bearings 18 and 20, the upper bearing 20 being held in alignment by a stainless steel ring 22 which is located above the tapered portion 24 of the shaft 14. A cooling connection 26 of a type which is also known to the industry is provided between the magnetic drive 10 and the upper portion of the shaft 14 in order that drive 10 may be kept cool during the extreme temperature which must be imposed by the temperature control bath during the reaction time.

The coupler 19 which is manufactured of stabilized stainless steel, such as 347 s.s., to withstand high hydrogen and hydrogen sulfide pressures at the high temperatures of the heat source is connected to the magnetic drive 10 on the pressure vessel 30 by gland nuts 21, and 23. Two ports 32, and 40 are provided in the coupler. The first port 32 consists of a nut 34 and plug 36; it is provided in order that a hydrogen line may be inserted as required to maintain the hydrogen partial pressure within the pressure vessel. A second input port 40 provides a sealed connection through the coupler into the pressure vessel in order that a thermocouple can be inserted down into the pressure vessel so that the critical temperature variable can be continuously monitored while the process is being conducted. A third port (not shown) may be provided opposite port 32 to serve as a vent for gaseous products; additional ports may be added for other purposes, as, for example, an additional thermocouple. As to the pressure vessel 30, it is fitted into the coupler 19 by means of a threaded neck portion 41. The drive shaft 14 reaches down through this neck 41 and into vessel 30. The impeller 16 which mixes the reactants is attached to the end of the driveshaft 14 and is comprised of vanes which are preferably twisted at a slight angle in order to mix the reactants in a downward direction. However vane orientation which results in different mixing patterns are also acceptable. To maximize mixing, a baffle 31 is attached to the thermocouple by means of stainless steel wire. The baffle 31 is comprised of two stainless steel strips each $\frac{1}{8}''$ wide, $1\frac{1}{2}''$ long, 1/16" thick, hanging side by side, attached top and bottom by a $\frac{1}{8}''$ piece of stainless steel. The baffle 31 is attached by stainless steel wire from the thermocouple 40 at a position about $\frac{1}{4}$ above the impeller 16. The baffle improves mixing of the reactants by impeller 16. The baffle is placed in the reaction tube above the impeller to break up any vortex action that the impeller makes, thereby improving the mixing of the contents of the reaction vessel. To initiate a reaction, the assembled magnetic drive 10, coupler portion 19 and pressure vessel 30 are attached to a pneumatic lift 50, and the pressure vessel 30 is lowered into a preheated temperature control bath 51 to the depth required to obtain and maintain the desired reaction temperature. The necessary hydrogen partial pressure is established via the port 32. The thermocouple is inserted directly into the pressure vessel via port 40 to monitor the temperature of the reactor contents continuously during the run. Using the same hydrogen feed port 32, the pressure in the reactor vessel can be monitored continuously during the run. The time required to attain the necessary reaction temperature has been determined to be between two and five minutes. Specifically, the desired heat up time may be about 5 minutes to reach 600° F.; about 30 minutes to reach 800° F.; or about 2 minutes to reach 900° F. At the end of the desired reaction time, the pressure vessel 30 is raised out of the temperature control bath 51 and immersed in an ice water bath 52 to quench the reaction within the pressure vessel 30. The time required to quench the reaction has been determined to be on the order of about 30 seconds.

Gaseous products are then vented through the exhaust port of the coupler into a high pressure gas sample tank which can be detached from the system. The high pressure vessel 30 itself is then detached from the coupler and the contents removed for analysis.

This new stirred microreactor has been found to reduce or eliminate many of the problems associated with previous microreactors by providing the continuous monitoring of the key variables of the process; and by avoiding loss of any of the reactants within the pressure vessel.

Modifications of the basic concepts disclosed in this application may occur to one skilled in the art. Therefore, the full scope of the invention claimed herein is to be determined by the appended claims.

What is claimed:

1. A batch-type, movable stirred microreactor for reacting a batch mixture of solid coal, liquid solvent and gaseous hydrogen at temperatures of 600°–900° F. in about two to five minutes, the microreactor comprising
   a sealed pressure vessel for holding reactants and having formed therein a first port for insertion of means for continuously monitoring temperature within said vessel, a second port means for feeding hydrogen into said pressure vessel to adjust the internal hydrogen pressure and a third port,
   a shaft extending into the pressure vessel through the third port, means for driving the shaft attached externally of said vessel,
   an impeller positioned within said vessel and attached to and driven by the shaft for stirring reactants in the vessel, the impeller comprising a plurality of substantially vertical vanes attached to and surrounding said shaft, baffle means mounted above the impeller for breaking up a vortex in fluid motion around the shaft, and
   means for selectivity raising and lowering said microreactor into and out of a temperature controlled bath for controllably causing heating and cooling of a batch mixture contained therein within a desired time period.

* * * * *